United States Patent [19]

Davies

[11] 4,287,406

[45] Sep. 1, 1981

[54] ELECTRIC CONTACT DEVICE WITH FLUIDIZED METAL PARTICLE BED

[75] Inventor: Evan J. Davies, Sutton Coldfield, England

[73] Assignee: National Research Development Corporation, London, England

[21] Appl. No.: 128,648

[22] Filed: Mar. 10, 1980

Related U.S. Application Data

[63] Continuation of Ser. No. 939,401, Sep. 5, 1978, abandoned.

[30] Foreign Application Priority Data

Sep. 8, 1977 [GB] United Kingdom ............... 37481/77

[51] Int. Cl.³ ............................................... C21D 9/62
[52] U.S. Cl. ...................................... 219/155; 219/71
[58] Field of Search .................... 219/50, 56, 71, 155, 219/156, 162

[56] References Cited

U.S. PATENT DOCUMENTS

| 436,519 | 9/1890 | Dewey ................................. 219/162 |
| 496,592 | 5/1893 | Burton ............................. 219/156 X |
| 537,011 | 4/1895 | Burton et al. .......................... 219/71 |
| 3,025,385 | 3/1962 | Tanaka ................................... 219/50 |
| 3,042,786 | 7/1962 | Babcock et al. ....................... 219/50 |
| 3,060,304 | 10/1962 | Tanaka ............................. 219/156 X |
| 3,136,836 | 6/1964 | Tanaka .............................. 219/50 X |

*Primary Examiner*—Gene Z. Rubinson
*Assistant Examiner*—Keith E. George
*Attorney, Agent, or Firm*—Merriam, Marshall & Bicknell

[57] ABSTRACT

An electric contact device for conveying electric current to an article such as a moving billet or wire comprising a current feeder member in a bed of electrically conductive de-oxidized metal particles and the article being placed in contact with the bed. The particles may be copper particles and the bed may be fluidized with a non-oxidizing gas and be maintained in a non-oxidizing atmosphere. Two contact devices may be provided at spaced positions to cause a current flow along the article. The contact device may operate as a switch by providing means to move the article into and out of the bed.

8 Claims, 5 Drawing Figures

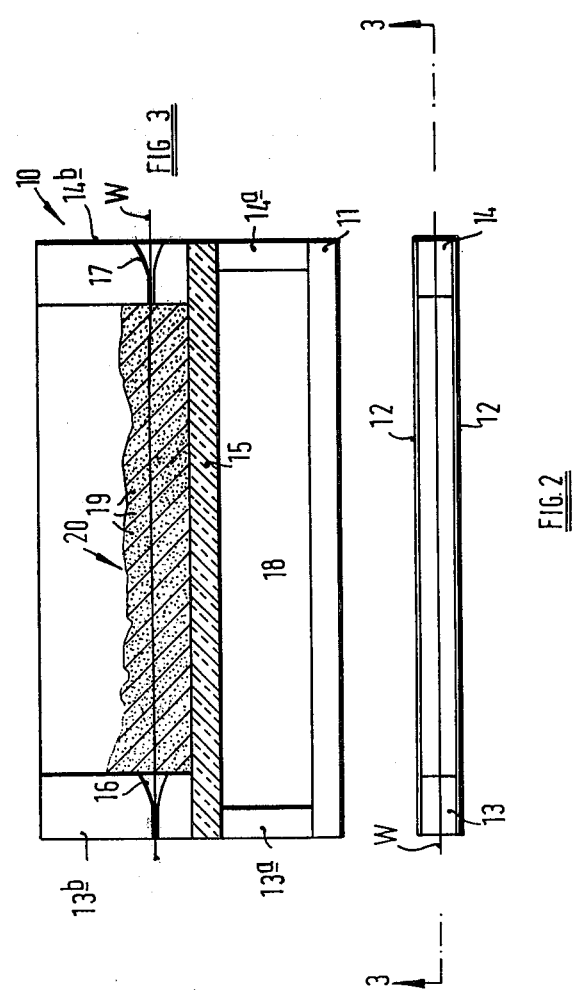

ELECTRIC CONTACT DEVICE WITH FLUIDIZED METAL PARTICLE BED

This is a continuation of application Ser. No. 939,401 filed Sept. 5, 1978 now abandoned.

BACKGROUND OF THE INVENTION

1. Field of the Invention

This invention relates to a contact device for conveying electric current to an article.

2. Description of the Prior Art

A commonplace requirement for metallurgical and other purposes is to heat a billet of metal. This is frequently done by passing a heavy current through the billet from one end to the other exploiting the effect of direct resistive heating. A difficulty encountered is to pass the current into and out of the billet. Conventionally this has been achieved by complicated water-cooled copper clamps which have the disadvantages of being expensive and of tending to mark or even damage the billet whilst still failing to ensure uniform contact over all the end surface of the billet.

Another commonplace requirement is to heat wire. Direct resistive heating is sometimes employed for this purpose with the current being passed into and out of the wire through copper drums over which the wire slides but this can lead to marking or damage of the wire surface due to arcing and therefore more often the furnaces are used, which involves much capital cost and some waste of heat.

It has been proposed in U.S. Pat. No. 3,060,304 to provide a method of heating an article by immersing the article in a heated bed of fluidised carbon particles, the article being heated mainly due to Joule's heat arising from the high contact rsistance between the fluidised electroconductive powder and the surface of the article. The apparatus used to carry out this method incidentally acts to provide an electric contact with the article to be heated and comprises a current feeder member adapted to contact a fluidised bed of carbon particles, means for fluidising the particles and means for maintaining a part of said article, spaced from the current feeder member, in contact with the fluidised bed of articles.

The applicants have found that when using carbon particles to introduce electric current into a static article needles of coagulated carbon particles tend to form in the fluidised bed leading to deterioration in the efficiency of the device. It is thought that the needles are due to localised overheating of the bed arising from firstly a "pinch effect", since when electric current flows through the particles there is a tendency for the particles to be squeezed together and thus form a concentrated current path, and secondly because carbon has a negative temperature co-efficient of resistance so that as the temperature of the carbon particles increases their resistance decreases thereby inreasing the current flow and so increasing the temperature with a consequent further increase in current flow and so on. These two effects are thought to give rise to the formation of the carbon needles.

SUMMARY OF THE INVENTION

The invention is intended to provide an electric contact device in which the problem of the needle formation encountered when carbon particles are used is overcome by providing an electric contact device, for conveying electric current to an article, comprising a container, a bed of uniformly distributed electrically conductive de-oxidised metal particles in said container, means to fluidize said particles with a non-oxidizing gas, means to provide a non-oxidising environment for said bed of particles, a current feeder member adapted to contact said bed, and means for maintaining a part of said article, spaced from the current feeder member, in contact with said bed of particles when fluidized.

Thus applicants invention provides a practical solution to the problem of introducing current into articles, such as a billet or wire, either when the article is stationary or when it is moving. The main advantages offered by the invention are that marking or extensive damage of the article is avoided, uniform contact is achieved over the part of the surface of the article through which current is to be introduced and the expense of, for example, copper cooled clamps or heating furnace is avoided.

The non-oxidising atmosphere and/or gas may be nitrogen.

The non-oxidising atmosphere and/or gas may be de-oxidising for example hydrogen or a hydrogen/nitrogen mixture the partial pressure ratio of which may be, for example 1:9.

Metal particles may be copper particles.

Preferably the article is electrically conductive and a like contact device is provided at a distant part of the same article, the two current feeder members of the contact devices being connected in an electric circuit.

The conductive article may be a billet or wire, which may be moving, as in continuous production.

In a contact device according to the present invention the conductive article of the contact device may comprise a movable switch member and there being means for moving the switch member into and out of the bed.

In use, one side of the current gap to be switched is connected to the current feeder member and the other side to the movable switch member.

In this form the invention is intended to provide a new and improved electrical switch.

BRIEF DESCRIPTION OF THE DRAWINGS

Three ways of carrying out the invention will now be described in detail with reference to the accompanying drawings wherein:

FIG. 2 is a plan view of a second embodiment of the invention, FIG. 3 is a section on the line 3—3 of FIG. 2.

DESCRIPTION OF THE PREFERRED EMBODIMENTS

Figure 1:
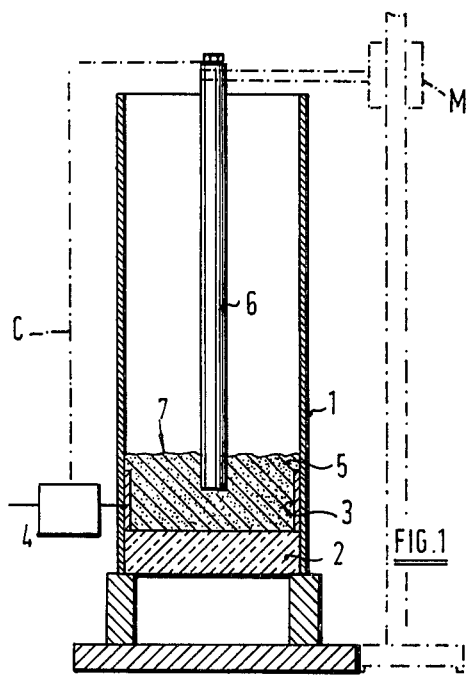
FIG. 1 is a diagrammatic vertical cross sectional view through one embodiment of the invention and showing a third embodiment in chain dotted line.

FIG. 1 illustrates a first embodiment of the invention which is a laboratory scale apparatus and which was used to investigate the application of current to a static article. The contact device comprises a glass column 1 fitted with a porous base 2 and having an annular current feeder member 3 fitted snugly within the column sitting on the base and connected via an insulated lead to a power source 4.

Stock copper particles of 200 microns diameter, with the usual oxidised surface, were de-oxidised by any known means, for example, by electrolysis or by pickling and washing, or by the Mond process e.g. passing hydrogen or a hydrogen/nitrogen mixture over the particles at an elevated temperature for a time sufficient to deoxidise the particles, the elevated temperature may be applied by heating the particles and/or the gas. After de-oxidising the particles were kept in a nitrogen atmosphere.

Still under nitrogen, the wet particles 5 were placed in the glass column 1. The wet particles were of course, in contact with the current feeder member. The porous base 2 was connected underneath to independent supplies of compressed nitrogen and hydrogen. If desired, provision may be made to pre-heat the gases.

A conductive article in the form of a steel rod 6 was pushed down into the bed of particles 5, spaced about 12 mm all round from the annular current feeder member 3, and was connected to the other side of the power source. If desired the rod 6 may be made of copper or other material.

Nitrogen was passed upwardly through the porous base 2 to dry the de-oxidised copper particles 5, and, when they were dry, the rate was adjusted so that the bed of particles 5 became fluidised. The height of the fluidised bed 7 was 105% of the bed when settled, but simple trails will show the best height for any specific application.

Current was switched on, and a voltage drop across the bed 7 was noted. This could be exploited to heat the steel rod 6 over and above the resistive heating which it itself was enjoying. Various currents up 1000 amps were passed and it was noted that after an initial increase, the voltage drop did not vary with the current.

If for any reason, incipient oxide appeared on the copper particles 5, possibly from minor gas leakage in the system, hydrogen, diluted by nine parts of nitrogen, was passed upwardly through the porous base and quickly de-oxidised the particles again in situ.

If desired, as well as, or instead of, heating the gases a heater may be provided to heat the particles of the bed.

The continuous fluidisation prevents the copper particles 5 from fusing together and the passage of gas counteracts any momentary local overheating.

The steel rod 6 was withdrawn from the bed 7, and despite the heavy currents conveyed to it, no marking such as burning, alloying or spark-erosion could be seen.

There are many industrial uses for this non-wetting, non-marking, contact device which can be metallurgically inert, such as in the direct resistance heating field. For example, referring to FIG. 5, a wire W to be annealed is passed through two contact devices 10 embodying the invention in sequence so that an electric current flows between the devices through the wire W. In the region between the devices 10 the wire W passes through a tube T full of inert gas to prevent scale formation and this tube may be thermally insulated to form an oven. This two device arrangement may be fitted "in line" for continuous production with wire or strip.

Figure 4:
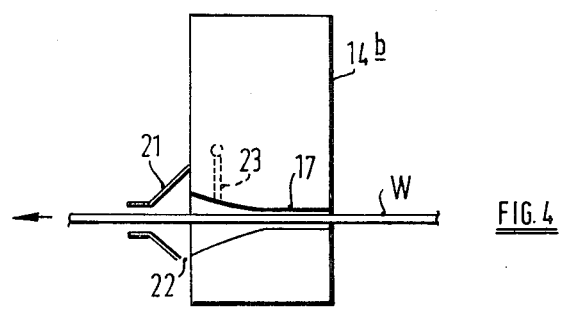
FIG. 4 is a side elevation to an enlarged scale of an optional part of the device of FIGS. 2 and 3.
Figure 5:
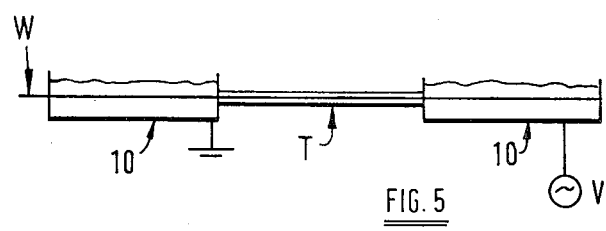
FIG. 5 is a diagrammatic representation of an apparatus for heating wire embodying two electric contact devices according to the present invention.

Referring now to FIGS. 2 and 4 the contact devices 10 used in the apparatus shown in FIGS. 5 will be described. The contact devices 10 are the same and hence only one will now be described and it should be appreciated that the contact device now to be described was developed from the laboratory apparatus described hereinbefore. The contact device comprises a base 11 made of a suitable insulating material. Extending vertically upwardly from the base 11 are a pair of spaced parallel side walls 12 made of copper sheet, 1 mm thick and which provide the current feeder members. The device also comprises end members 13, 14 each in two parts. The lower parts 13a, 14a, are fixed to the base 11 and support on their upper ends a conventional fluidised bed ceramic diffuser plate 15. If desired the diffuser plate may be made of other materials such as perforated stainless steel sheet. The upper members 13b, 14b provide feed and exit aperture 16, 17 respectively for the wire W. In the example illustrated the central axis of the passages 16, 17 is 12 mm above the diffuser plate 15 and the smaller cross section part of each aperture is 1.5 mm thick whilst at their downstream ends the apertures flare to a maximum dimension of 10 mm. If desired the passages may be of other configuration and it is considered that if the wire to be treated is maintained relatively straight a considerably less flared passage may be provided. Since these passages are only provided to prevent leakage of the copper powder in a further embodiment of the invention one passage can be eliminated by tilting the bed so that the wire leaves the bed before the end. This tilt also has the advantage that any powder dragged forward with the wire flows back into the bed.

The end members 13, 14 are made of electrically insulating material, for example, of compressed asbestos such as that produced under the Trade name "SINDANYO" but other material may be used such as Tufnol but preferably an insulating material having a high wear resistance is used at least for the parts of the members through which the wire passes. It is preferred that end members 13b, 14b are provided which inserts in which the passages 16 and 17 are formed to facilitate replacement if necessary, due to wear, for example the end members 13b, 14b could be made of metal with a ceramic or other insulating and hard wearing insert.

In the example described the parts are clamped together by conventional screw threaded fasteners so that the contact device can be disassembled and any necessary parts replaced. If desired however the device may be constructed in any desired manner, for example, the parts may be permanently secured together, except for replaceable passage defining parts if these are provided.

The particles 19, hereinafter to be described, of the fluidised bed 20 are disposed in the container provided by the diffuser plate 15, end members 13b, 14b and the upper part of the side walls 12 whilst fluidising gas is introduced into the chamber 18 below the diffuser plate 15 and is fed at such a pressure that it is above the pressure at which the pressure drop across the bed 20 becomes equal to the weight per unit area of the bed so that the bed expands to permit the additional flow of gas.

The pressure in the bed 20 is maintained so that the gas velocity is just sufficient to fluidise the bed, although higher pressures are possible but waste fluidising gas.

The copper side walls 12 are connected to a source of electric potential so that the walls 12 are at equal potential.

In the example under discussion the particles 19 of the fluidised bed 20 are deoxidised copper particles of 200 microns diameter. The particles 19 used in the device may be commercially available particles and thus would have the usual oxidised surface and before they can be used in the device of the present invention they require to be deoxidised as described in connection with the first embodiment.

The non-oxidising gas of the present example is nitrogen and the rate of flow of the nitrogen is adjusted so that a fluidised bed of particles is just fluidised. The degree of fluidisation is unimportant over a wide range, and a low level of fluidisation can be used to minimise gas usage. If different heights of bed 20 are required for any specific application simple trial will establish the rate of nitrogen flow required.

In the example described, the device is used to apply a current of 78 amps at 41.5 volts to a copper coated welding wire for use in a $CO_2$ welding process, the wire being of 1.2 mm diameter and the requirement being to heat the wire to an annealing temperature of 800° C. whilst the wire is travelling at a speed of 45.7 meters per minute.

The power required is dependent, of course, upon the area, velocity of travel, specific heat, and density of the wire, the temperature to which it is to be heated and the distance between the contact devices be used to apply the current to the wire. In the particular example described it was calculated that a current of 78 amps at 41.5 volts was required.

Initial tests indicated that there was a voltage drop of approximately 1.5 volts in the system and thus the potential difference to be applied between the plates 12 of the two contact devices is 43 volts at 78 amps and this was found to heat the wire to the required temperature of 800° C.

Although in the above example the width of the bed 20 is about 12 mm the bed may be of any desired width although in practical terms a width of 12 mm is about the minimum practicable and normally the bed would be not less than 10 times the wire diameter to achieve adequate clearance between the wire and side walls of the bed.

In order to achieve fluidisation with a minimum of gas flow obviously the width of the bed should be as small as practicable and in general terms the width of the bed should not be less than 10 times the particle size.

In the present example a bed 200 mm long by 12 mm wide and 50 mm deep is provided and a depth of copper particles of 25 mm. Thus the volume of these copper particles equals 25 mm × 12 mm × 200 mm = 60 cc.

If it is desired to cool the bed 20 water cooling may be provided either by way of pipes embedded within the bed or by cooling the side plates 12, for example, by providing them with a labyrinthine water cooling tube fixed to the surface of the plates or by making the plates hollow and providing a water passage therein.

It is found that in practice utilising the feed passages as illustrated in the drawing, which have a smallest diameter of 1.5 mm when using a wire of 1.2 mm diameter that very little leakage of copper particles occurs and such particles as do leak can be collected and returned to the bed, for example, by providing, referring to FIG. 4, a generally frusto-conical funnel 21 outside the bed with an aperture 22 at the bottom through which any escaped particles can be collected.

If desired a gas feed passage 23 and means to lead non-oxidising gas thereto may be provided to the passages 16, 17 to provide a positive pressure within the passages and thus to prevent particles escaping from the bed through the passage.

It is preferred that the end plates are insulating so as to avoid the bed being short circuited if the wire should touch the walls of the aperture which is likely to occur relatively often in practice.

In certain applications it may be desirable for the article to be treated to be earthed outside the treatment area. In this case it is necessary to provide three contact devices, the two end contact devices being at earth potential and the central contact device being at the desired potential.

In the present example the fluidised bed is relatively shallow i.e. up to a depth of approximately 23 mm but if desired a deeper fluidised bed may be provided. In practice, it has been found that little depth above the wire is needed.

If the device is operated so that the bed is fluidised and then the current switched on difficulties are sometimes encountered in starting transmission of current to the article and it is necessary to apply a relatively high starting voltage and then to reduce the voltage to the normal operating or holding voltage. The starting voltage may be more than 10 times the normal holding voltage.

It has been found however, that if the current is started to be passed before the bed is fluidised and thereafter the bed is fluidised then no starting problems are encountered particularly when the current supply apparatus incorporates a conventional welding transformer which automatically provides a relatively high starting voltage.

If desired a facility for providing a deoxidising gas into the interior of the device may be provided such as the mixture of hydrogen and nitrogen described in connection with the first embodiment. Also, if desired means may be provided to preheat the fuidising gases or a heater may be provided to heat the particles of the bed.

In a third embodiment of the invention, shown in chain dotted line, in FIG. 1, the contact device comprises an electrical switch and this is achieved by providing means M to move the rod 6 of the first embodiment up and down, that is, into and out of the fluidised bed 7. One side of the circuit gap to be opened and closed by the switch is connected to the steel rod 6 whilst the other side is connected to the annular current feeder member 3. Thus the circuit C can be completed or broken by lowering and raising the rod 6 into and out of the bed 7. At the instant of opening the switch the presence of a cool inert gas imparts desirable current breaking properties.

Although in the examples described hereinbefore the particles of the fluidised bed have been copper particles any other electrically conductive particles may be used, including graphite; coated particles, for example, gold plated copper particles; or particles part of which is not conductive whilst another part is, for example, a particle with a non-conductive core and a conductive outer shell.

An important feature of the devices described above is the steps taken to ensure that the bed particles have no oxide coating since the presence of such a coating has the effect of rendering the bed poorly conductive due to the resistance caused by the oxide.

Although the invention has been described by way of supplying an electric current to an electrical conductor it may be desirable, for electrostatic or other purposes, to produce an electrical potential at an insulating or almost insulating surface by means of a contact device embodying the invention.

I claim:

1. An electric contact device, for conveying electric current to an article, comprising a container, a bed of uniformly distributed electrically conductive de-oxidised metal particles in said container, means to fluidize said particles with a non-oxidizing gas, means to provide a non-oxidising environment for said bed of particles, a current feeder member adapted to contact said bed, and means for maintaining a part of the article, spaced from the current for maintaining a part of the article, spaced from the current feeder member, in contact with said bed of particles when fluidized.

2. A device according to claim 1 in which the non-oxidising environment is de-oxidising.

3. A device according to claim 1 in which the metal is copper.

4. A device according to claim 1 in which the article is electrically conductive and a like contact device is provided at a distant part of the said article, the two current feeder members of said contact devices being connected in an electric circuit.

5. A device according to claim 4 in which the conductive article is a billet.

6. A device according to claim 4 in which the conductive article is movable during current application.

7. A device according to claim 6 wherein the said article is a wire.

8. A device according to claim 1 in which the conductive article comprises a movable switch member there being means for moving the switch member into and out of said bed, one side of a circuit to be switched being connected to said current feeder member and the other side to said movable switch member.

* * * * *